US011496556B1

(12) United States Patent
Kolar et al.

(10) Patent No.: US 11,496,556 B1
(45) Date of Patent: Nov. 8, 2022

(54) SERVICE PROVIDER SELECTION FOR APPLICATION-DRIVEN ROUTING

(71) Applicant: Cisco Technology, Inc., San Jose, CA (US)

(72) Inventors: Vinay Kumar Kolar, San Jose, CA (US); Jean-Philippe Vasseur, Saint Martin d'Uriage (FR); Grégory Mermoud, Venthône (CH); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/240,292

(22) Filed: Apr. 26, 2021

(51) Int. Cl.
*H04L 67/1008* (2022.01)
*H04L 12/28* (2006.01)
*H04L 67/1021* (2022.01)
*G06F 9/50* (2006.01)
*G06N 20/00* (2019.01)

(52) U.S. Cl.
CPC ........ *H04L 67/1008* (2013.01); *G06F 9/5077* (2013.01); *H04L 12/2854* (2013.01); *H04L 67/1021* (2013.01); *G06N 20/00* (2019.01)

(58) Field of Classification Search
CPC ....... H04L 67/16; H04L 67/1001–1034; H04L 41/00–5096; H04L 47/00–83; G06F 9/50–5094; G06N 20/00–20
See application file for complete search history.

(56) References Cited

U.S. PATENT DOCUMENTS

| 7,447,151 | B2 | 11/2008 | McDysan |
| 9,467,970 | B1 * | 10/2016 | Kim ..................... H04L 67/1008 |
| 9,491,035 | B1 * | 11/2016 | Pauley ................ G06F 9/45533 |
| 9,712,386 | B1 * | 7/2017 | Chen .................... G06F 9/45558 |
| 9,983,860 | B1 * | 5/2018 | Koty ........................ H04L 67/10 |
| 10,042,665 | B2 * | 8/2018 | Puranik .................. H04L 49/70 |
| 10,355,989 | B1 * | 7/2019 | Panchal .................. H04L 67/10 |
| 10,530,632 | B1 * | 1/2020 | Mukhopadhyaya ........................ H04L 41/5041 |
| 10,542,077 | B1 * | 1/2020 | Balakrishnan .......... H04L 45/22 |
| 10,749,785 | B1 * | 8/2020 | Thangavel .......... H04L 43/0817 |
| 10,892,937 | B1 * | 1/2021 | Mukhopadhyaya .... H04L 45/08 |

(Continued)

OTHER PUBLICATIONS

S. Venkateswaran and S. Sarkar, "Fitness-Aware Containerization Service Leveraging Machine Learning," in IEEE Transactions on Services Computing, doi: 10.1109/TSC.2019.2898666. (Year: 2019).*

(Continued)

*Primary Examiner* — Mohamed A. Wasel
*Assistant Examiner* — Julian Chang
(74) *Attorney, Agent, or Firm* — Behmke Innovation Group LLC; Kenneth J. Heywood; Jonathon P. Western

(57) ABSTRACT

In one embodiment, a device receives application experience metrics for a software-as-a-service application. The device generates, based on the application experience metrics, a predictive model that predicts application experience scores for a plurality of network service providers that provide connectivity to the software-as-a-service application. The device selects a particular network service provider for use by a location, based on an application experience score predicted by the predictive model. The device sends an indication of the particular network service provider to the location.

16 Claims, 11 Drawing Sheets

(56) References Cited

U.S. PATENT DOCUMENTS

| | | | |
|---|---|---|---|
| 10,924,429 B1* | 2/2021 | Gupta | H04L 47/828 |
| 10,965,737 B1* | 3/2021 | Parulkar | G06F 9/5072 |
| 10,979,534 B1* | 4/2021 | Parulkar | G06F 9/5072 |
| 11,038,953 B1* | 6/2021 | Nayak | H04L 45/28 |
| 11,070,453 B2* | 7/2021 | Thiagarajan | H04L 45/121 |
| 11,070,646 B1* | 7/2021 | Lingafelt | H04L 67/1008 |
| 2004/0153533 A1* | 8/2004 | Lewis | H04L 41/28 709/223 |
| 2008/0046569 A1* | 2/2008 | DePue | H04L 67/16 709/227 |
| 2011/0208668 A1 | 8/2011 | Phillips | |
| 2012/0072762 A1* | 3/2012 | Atchison | G06F 9/455 718/1 |
| 2012/0301134 A1* | 11/2012 | Davari | H04B 10/40 398/9 |
| 2013/0007740 A1* | 1/2013 | Kikuchi | G06F 11/301 718/1 |
| 2013/0086236 A1* | 4/2013 | Baucke | G06F 9/45558 709/223 |
| 2013/0125124 A1* | 5/2013 | Kempf | H04L 61/103 718/1 |
| 2013/0343174 A1* | 12/2013 | Guichard | H04L 41/5025 370/218 |
| 2014/0149794 A1* | 5/2014 | Shetty | H04L 67/1095 714/20 |
| 2014/0173112 A1* | 6/2014 | Seago | H04L 67/32 709/226 |
| 2015/0046374 A1 | 2/2015 | Jacobs et al. | |
| 2015/0067171 A1* | 3/2015 | Yum | H04L 67/2809 709/226 |
| 2015/0332357 A1* | 11/2015 | McBride | H04L 41/0803 705/26.1 |
| 2015/0365288 A1* | 12/2015 | Van Der Merwe | H04W 92/02 370/254 |
| 2016/0127454 A1* | 5/2016 | Maheshwari | H04L 67/2838 709/223 |
| 2016/0142256 A1* | 5/2016 | Yang | H04L 41/0823 709/223 |
| 2016/0294732 A1* | 10/2016 | Chou | H04L 45/38 |
| 2016/0301598 A1* | 10/2016 | Strijkers | H04L 12/66 |
| 2016/0308762 A1* | 10/2016 | Teng | H04L 61/256 |
| 2016/0337175 A1* | 11/2016 | Rao | H04L 12/4633 |
| 2016/0337474 A1* | 11/2016 | Rao | H04L 41/5051 |
| 2017/0004548 A1 | 1/2017 | Goel et al. | |
| 2017/0214550 A1* | 7/2017 | Kumar | H04L 67/1095 |
| 2017/0220966 A1 | 8/2017 | Wang | |
| 2017/0244593 A1* | 8/2017 | Rangasamy | H04L 12/4683 |
| 2017/0257341 A1* | 9/2017 | Arsenault | H04L 61/6004 |
| 2017/0279692 A1* | 9/2017 | Llagostera | G06F 8/60 |
| 2017/0295077 A1* | 10/2017 | Dyszynski | H04L 67/18 |
| 2017/0295086 A1* | 10/2017 | Dyszynski | H04L 45/02 |
| 2017/0310605 A1* | 10/2017 | Garcia | H04L 47/822 |
| 2017/0331762 A1* | 11/2017 | Miyazawa | H04L 41/5009 |
| 2017/0374174 A1* | 12/2017 | Evens | H04L 67/322 |
| 2018/0115468 A1* | 4/2018 | Bildhauer | G06F 9/5055 |
| 2018/0123901 A1* | 5/2018 | Yermakov | G06N 20/00 |
| 2018/0123964 A1* | 5/2018 | Kore | H04L 41/5009 |
| 2018/0124189 A1* | 5/2018 | Edgington | H04L 41/50 |
| 2018/0167294 A1* | 6/2018 | Gupta | H04L 67/141 |
| 2019/0130313 A1* | 5/2019 | Patavardhan | G06N 5/04 |
| 2019/0140919 A1* | 5/2019 | Smith | H04L 41/5009 |
| 2019/0141119 A1* | 5/2019 | Bernat | H04L 41/5006 |
| 2019/0149424 A1* | 5/2019 | O'Neill | G06F 11/3428 709/224 |
| 2019/0158367 A1* | 5/2019 | Barooah | H04L 67/10 |
| 2019/0208009 A1* | 7/2019 | Prabhakaran | H04L 67/16 |
| 2019/0273807 A1* | 9/2019 | Mimran | H04L 67/18 |
| 2019/0312939 A1* | 10/2019 | Noble | G06F 21/602 |
| 2019/0386904 A1* | 12/2019 | Srivatsan | H04L 41/0806 |
| 2020/0099742 A1* | 3/2020 | Puente Pestana | H04L 67/1021 |
| 2020/0153701 A1* | 5/2020 | Mohan | H04L 47/2425 |
| 2020/0153921 A1* | 5/2020 | Kolluri Venkata Sesha | H04L 67/16 |
| 2020/0162347 A1* | 5/2020 | Dotchkoff | H04L 67/125 |
| 2020/0169480 A1* | 5/2020 | Shimokawa | H04L 41/5051 |
| 2020/0169856 A1* | 5/2020 | Yang | H04L 43/16 |
| 2020/0218579 A1* | 7/2020 | D M | H04L 41/5054 |
| 2020/0244605 A1* | 7/2020 | Nagaraja | H04L 67/16 |
| 2020/0244727 A1* | 7/2020 | Hill | H04L 67/20 |
| 2020/0257567 A1* | 8/2020 | Fontanari Filho | G06F 9/45558 |
| 2020/0296012 A1* | 9/2020 | Paruchuri | H04L 43/0835 |
| 2020/0310847 A1* | 10/2020 | Schulze | G06F 11/301 |
| 2020/0327434 A1* | 10/2020 | Maeser | H04L 41/5096 |
| 2020/0380627 A1* | 12/2020 | Jarvis | G06Q 50/265 |
| 2020/0382385 A1* | 12/2020 | Vasseur | H04L 41/16 |
| 2021/0019740 A1* | 1/2021 | Bhamidipati | G06Q 20/065 |
| 2021/0067468 A1* | 3/2021 | Cidon | H04L 43/026 |
| 2021/0142287 A1* | 5/2021 | Barrie | G06F 9/547 |
| 2021/0144202 A1* | 5/2021 | Maciocco | H04L 67/10 |
| 2021/0168027 A1* | 6/2021 | Parulkar | G06F 9/5072 |
| 2021/0168052 A1* | 6/2021 | Parulkar | H04L 67/289 |
| 2021/0168092 A1* | 6/2021 | Gupta | H04L 47/788 |
| 2021/0174281 A1* | 6/2021 | Bhaskara | G06Q 10/06315 |
| 2021/0176266 A1* | 6/2021 | Ramamurthy | G06F 9/45558 |
| 2021/0359948 A1* | 11/2021 | Durrani | H04L 67/10 |
| 2021/0374835 A1* | 12/2021 | Waldron | H04L 67/63 |
| 2021/0377185 A1* | 12/2021 | Durrani | H04L 41/0816 |
| 2022/0050938 A1* | 2/2022 | Mukherjee | G06F 9/505 |

OTHER PUBLICATIONS

R. Karim, C. Ding and A. Miri, "End-to-End Performance Prediction for Selecting Cloud Services Solutions," 2015 IEEE Symposium on Service-Oriented System Engineering, 2015, pp. 69-77, doi: 10.1109/SOSE.2015.11. (Year: 2015).*

Farokhi, Soodeh, et al. "Hierarchical SLA-based service selection for multi-cloud environments." 4th International Conference on Cloud Computing and Services Science. 2014. (Year: 2014).*

G. Baranwal and D. P. Vidyarthi, "A framework for selection of best cloud service provider using ranked voting method," 2014 IEEE International Advance Computing Conference (IACC), 2014, pp. 831-837, doi: 10.1109/IAdCC.2014.6779430. (Year: 2014).*

Eisa, Mona, et al. "Modelling and simulation of qos-aware service selection in cloud computing." Simulation Modelling Practice and Theory 103 (2020): 102108. (Year: 2020).*

Narayana, Srinivas, et al. "To coordinate or not to coordinate? wide-area traffic management for data centers." Dept. Comput. Sci., Princeton Univ., Princeton, NJ, USA, Tech. Rep. TR-998-15 (2012). (Year: 2012).*

"Cloud On-Ramp", online, accessed Apr. 8, 2021, 5 pages, IronMountain.com.

* cited by examiner

SERVICE PROVIDER SELECTION FOR APPLICATION-DRIVEN ROUTING

TECHNICAL FIELD

The present disclosure relates generally to computer networks, and, more particularly, to the selection of a service provider for application-driven routing.

BACKGROUND

Applications are increasingly adopting the software-as-a-service (SaaS) model in which the application is hosted centrally, such as in the cloud. To connect to a SaaS application, a network administrator will typically select a network service provider and configure routing policies for the application traffic, accordingly. Often, an administrator will do so by leveraging their expertise and based on one-time connectivity measurements such as latency, loss, and estimated bandwidth. However, the application experience of users of the application may greatly differ, depending on the network service provider selected by the administrator. Further, even if the selected service provider offers acceptable application experience for a particular SaaS application, there is no guarantee that the same application provider will offer acceptable application experience for another SaaS application.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
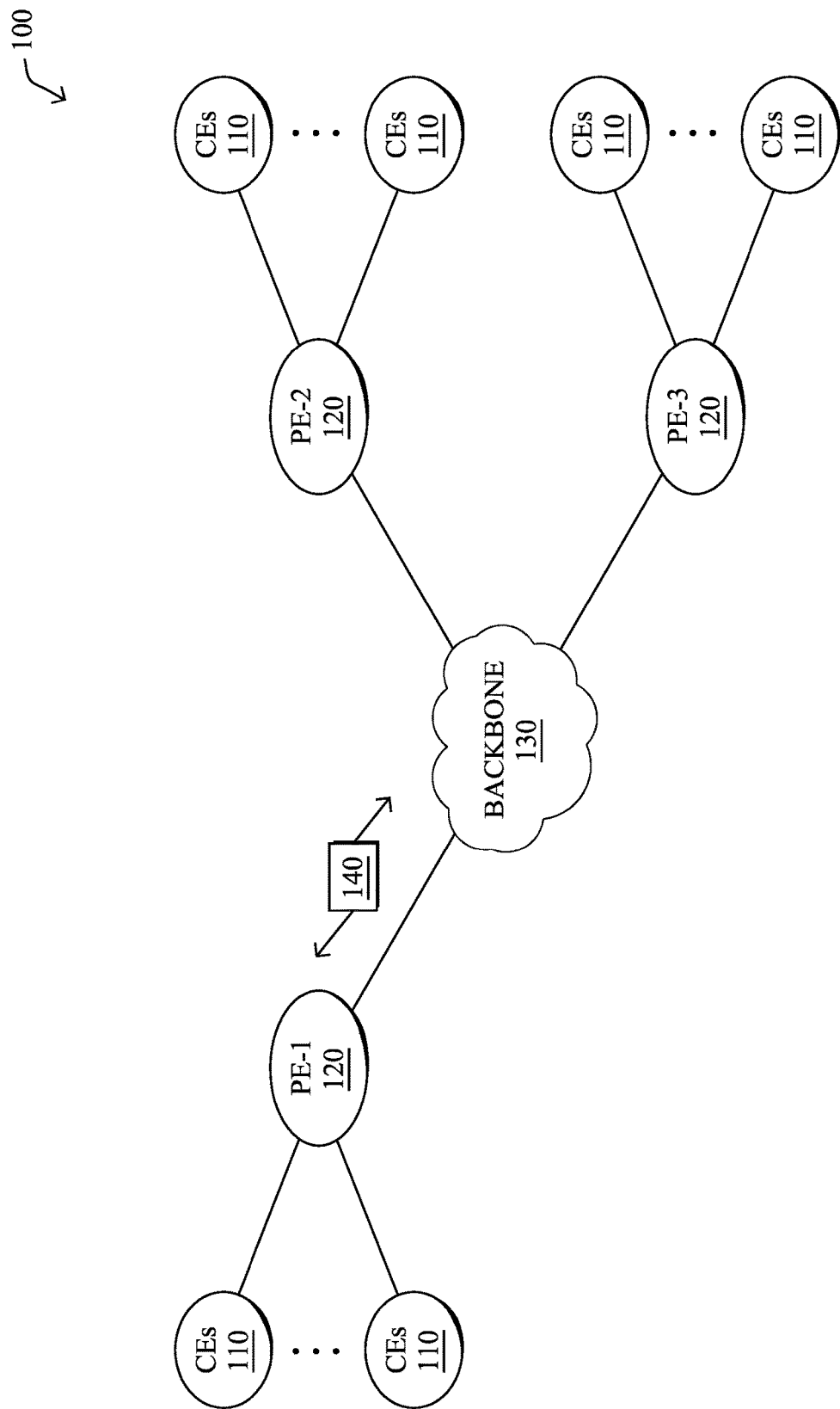
FIGS. 1A-1B illustrate an example communication network.

According to one or more embodiments of the disclosure, a device receives application experience metrics for a software-as-a-service application. The device generates, based on the application experience metrics, a predictive model that predicts application experience scores for a plurality of network service providers that provide connectivity to the software-as-a-service application. The device selects a particular network service provider for use by a location, based on an application experience score predicted by the predictive model. The device sends an indication of the particular network service provider to the location.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
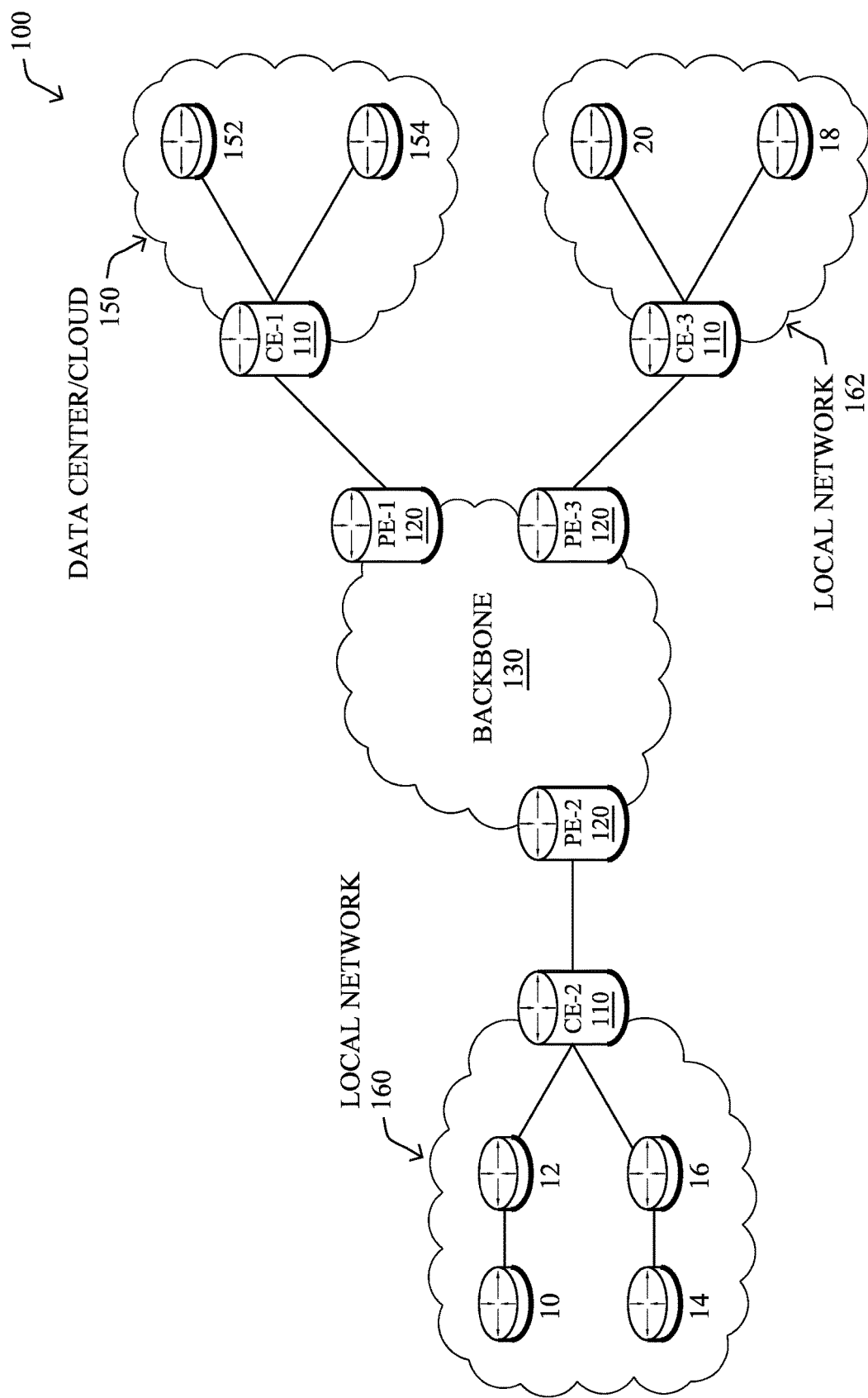

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
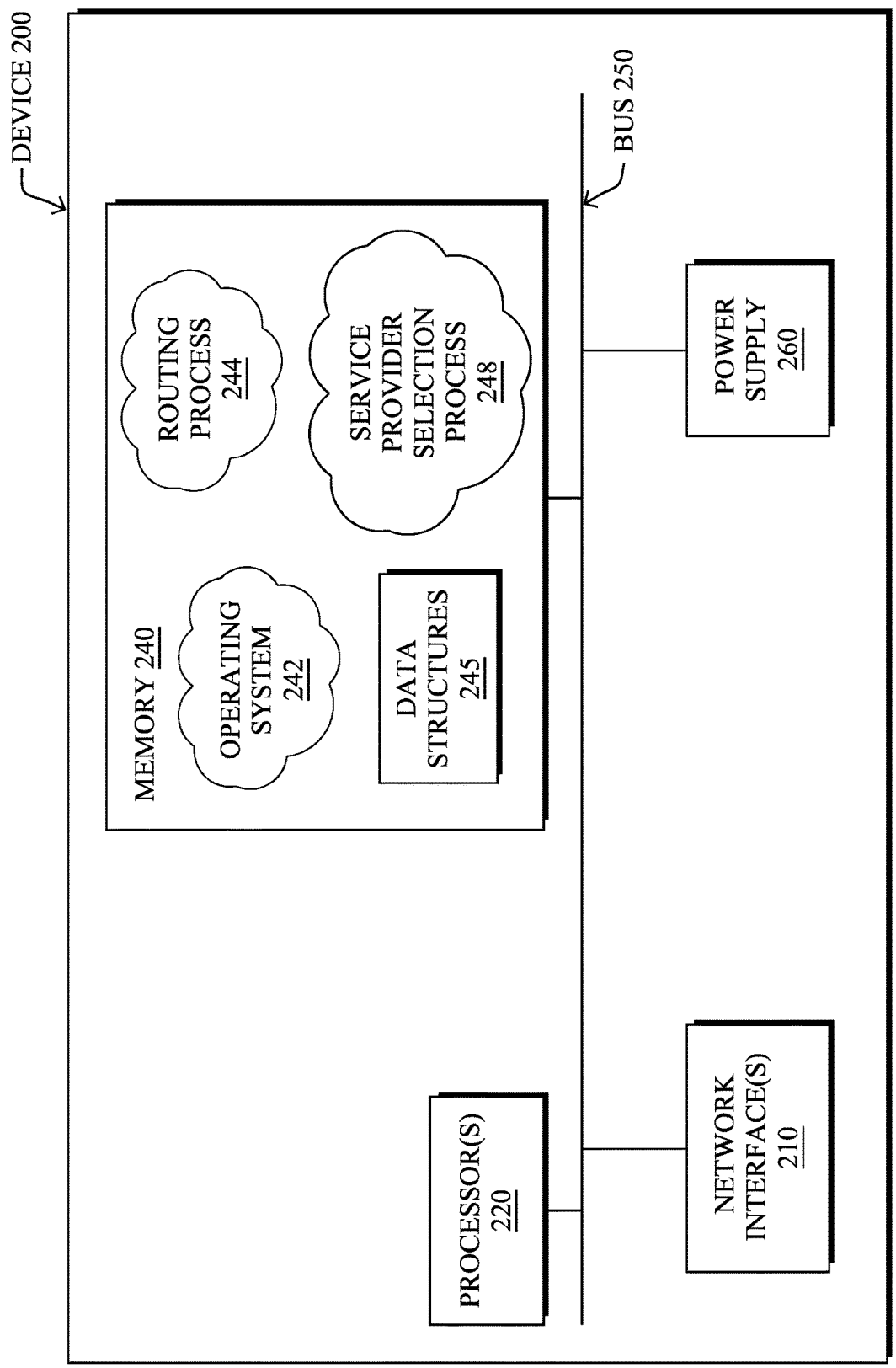
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a service provider selection process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or service provider selection process 248 may also include computer executable instructions that, when executed by processor(s) 220, cause device 200 to perform the techniques described herein. To do so, in some embodiments, routing process 244 and/or service provider selection process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or service provider selection process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or service provider selection process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
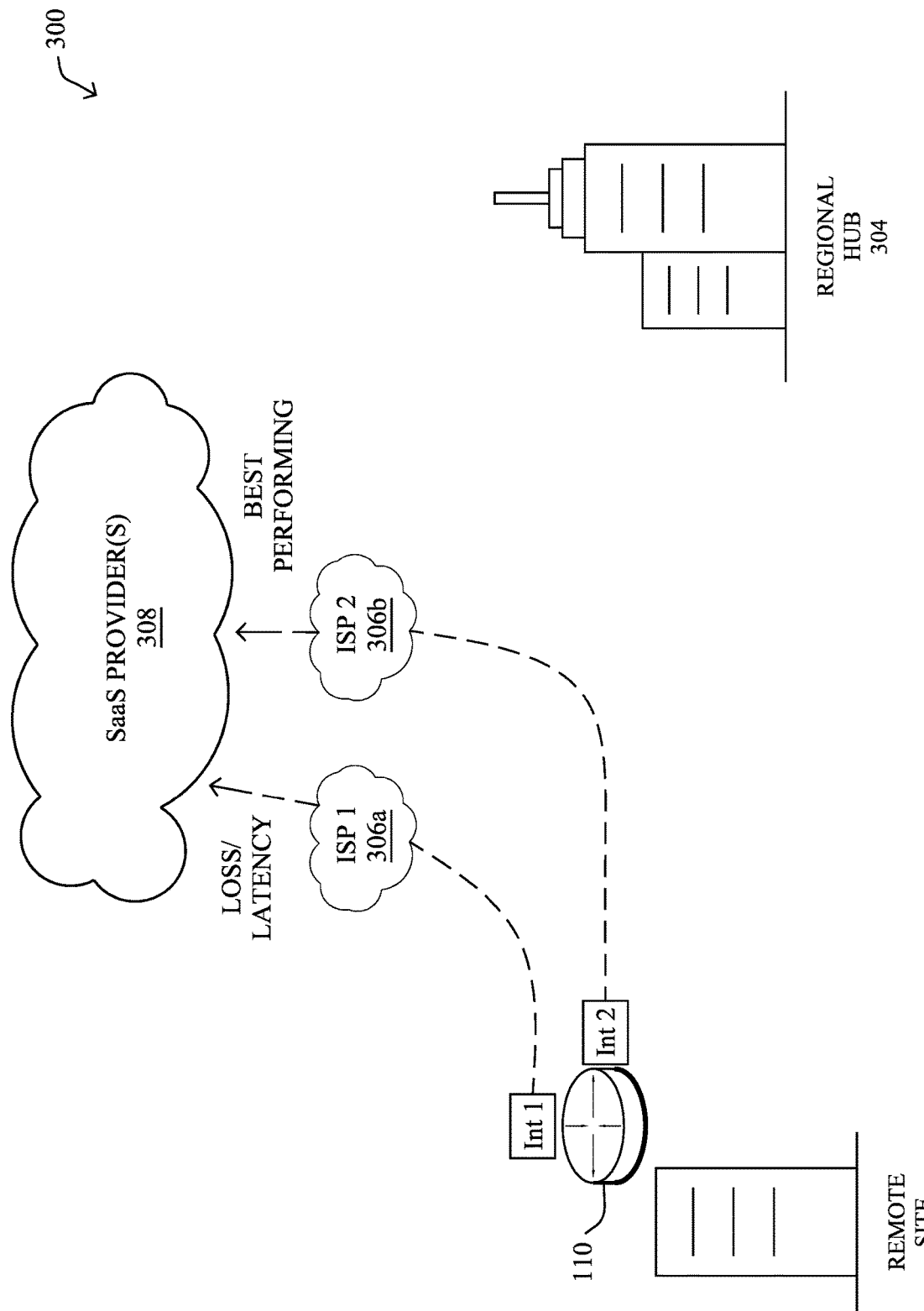
FIGS. 3A-3B illustrate example network deployments.
Figure 3B:
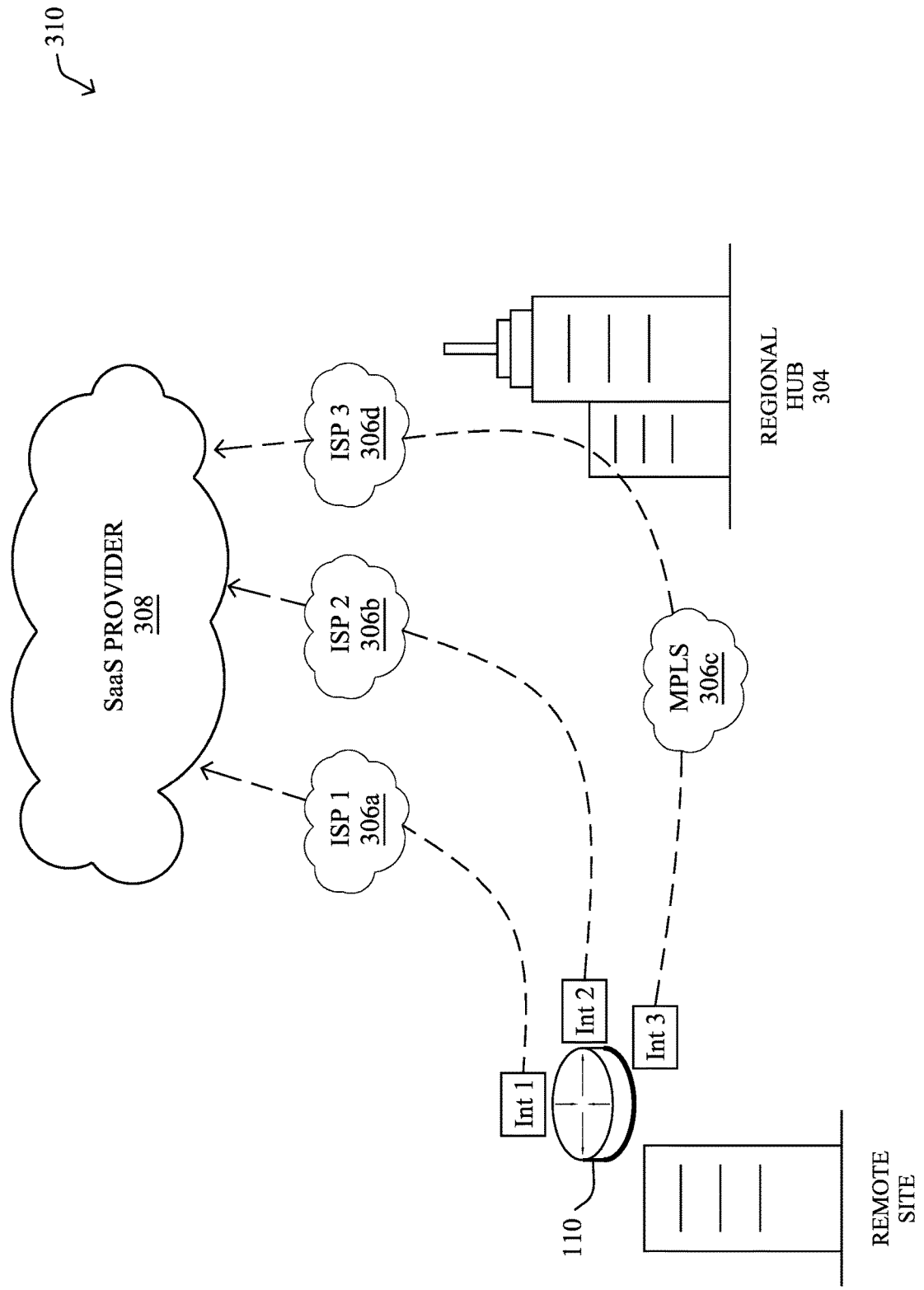

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
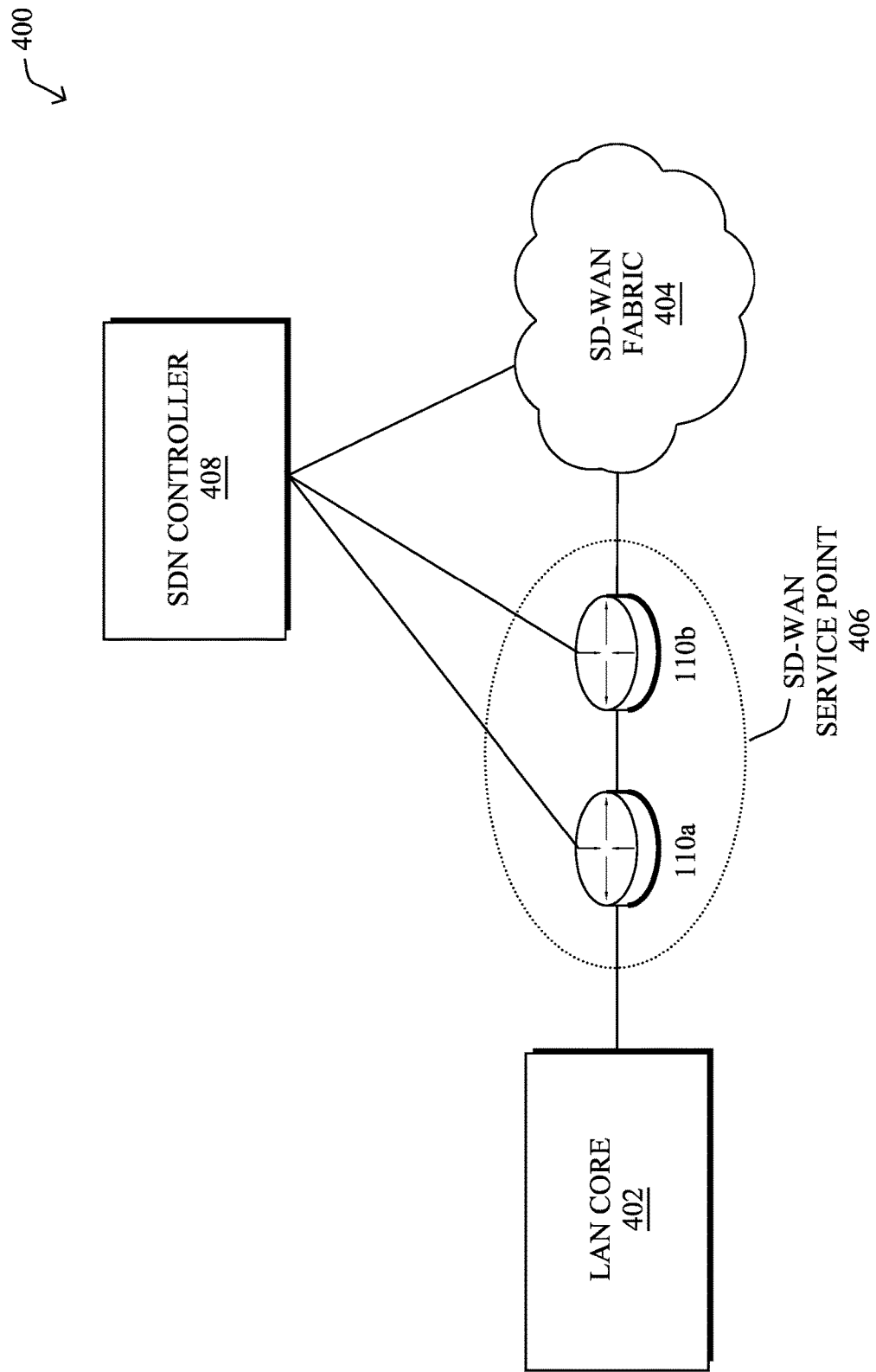
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

- The SLA for the application is 'guessed,' using static thresholds.
- Routing is still entirely reactive: decisions are made using probes that reflect the status of a path at a given time, in contrast with the notion of an informed decision.
- SLA failures are very common in the Internet and a good proportion of them could be avoided (e.g., using an alternate path), if predicted in advance.

Figure 4B:
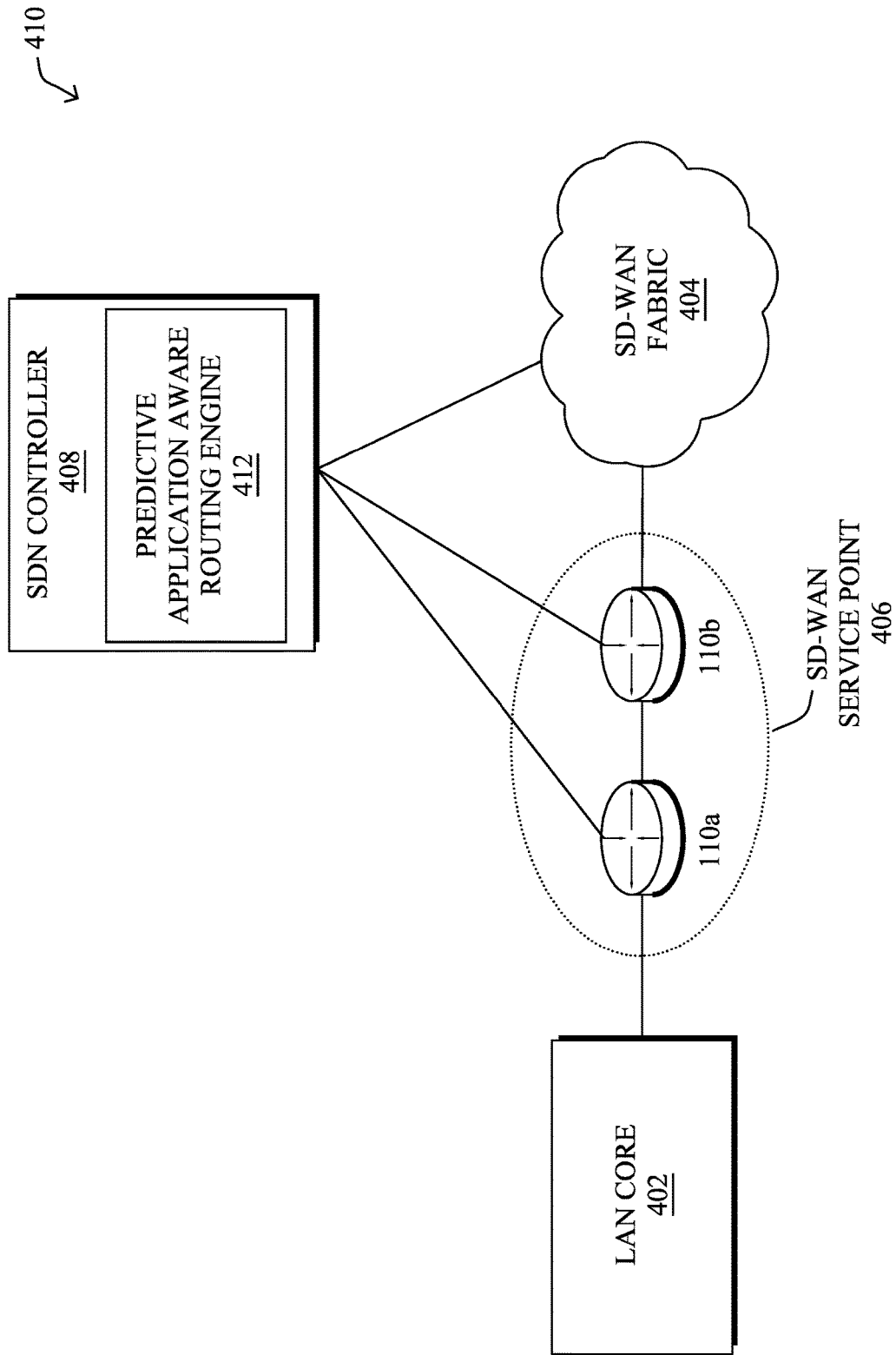

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or service provider selection process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As noted above, enterprises often equip their edge routers to connect to multiple service providers. The choice of service provider greatly dictates the type of connectivity to SaaS and other applications used by clients. In addition, the type of SP connectivity often varies over time and dictates the performance to SaaS applications.

Figure 5:
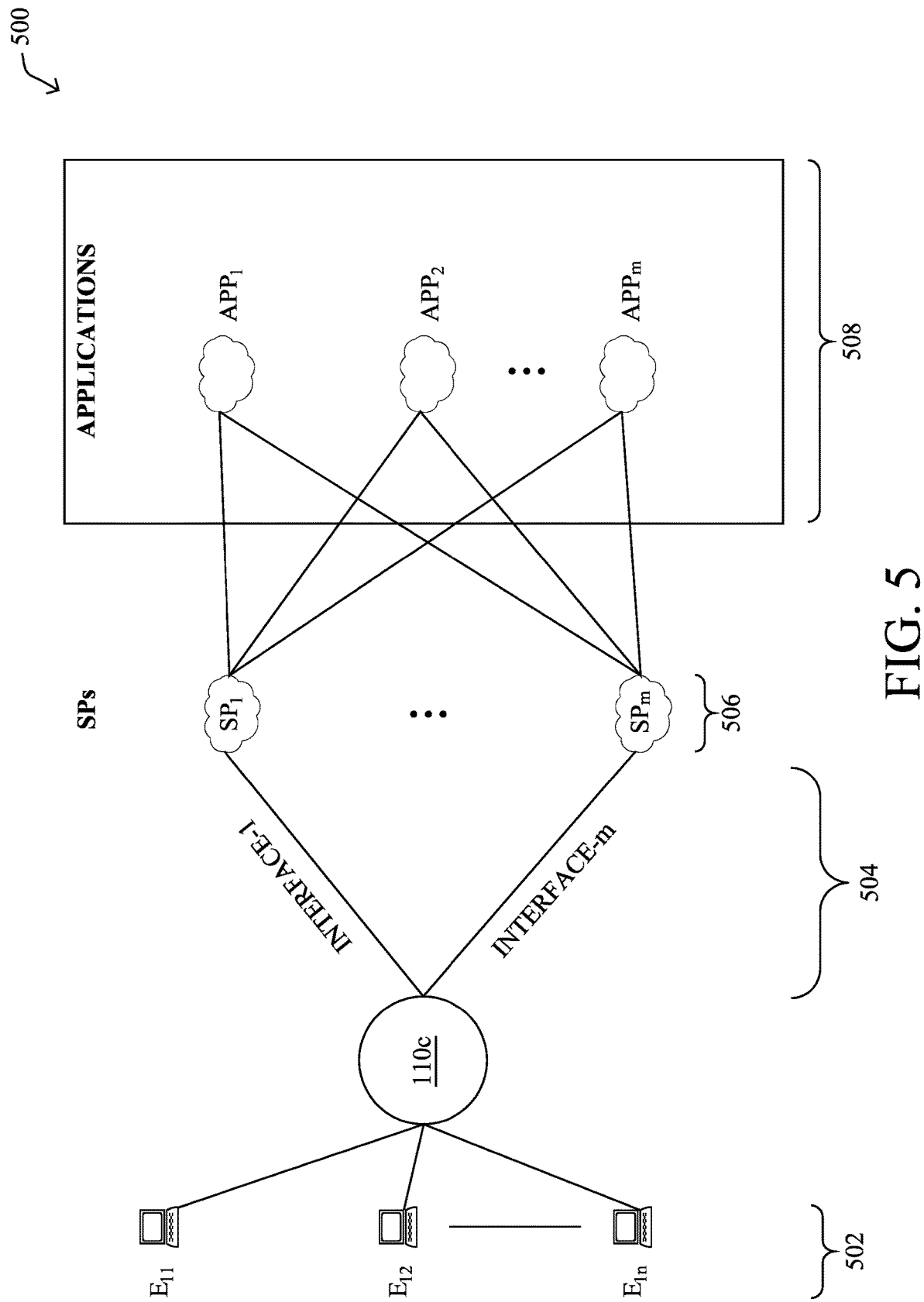
FIG. 5 illustrates an example of multiple service providers offering connectivity to software-as-a-service (SaaS) applications.

For instance, FIG. 5 illustrates an example 500 of multiple service providers (SPs) 506 offering connectivity to software-as-a-service (SaaS) applications 508. As noted previously, many edge routers now support multiple connections (e.g., an MPLS connection and an IP connection, a cellular connection and an IP connection, etc.), via different network providers. For instance, consider the case in which a particular location includes any number of endpoints 502, such as Err-Ern shown, and an edge router 110c. In turn, edge router 110c may have m-number of interfaces 504 connected to m-number of SPs 506 that can provide connectivity between the location and any number of SaaS applications 508.

Typically, a network administrator will set the routing policies for edge router 110c that specifies which applications are to be routed via which interfaces 504/SPs 506, based on based on their expertise and/or one-time connectivity measurements such as latency, loss, and estimated bandwidth. However, such preset policies often do not enable the optimal choice of service provider to enhance application experience. For instance, assume that the administrator selects Interface-1 with SP1, to convey traffic between edge router 110c and SaaS application $App_1$. While it may be possible that SP1 is able to offer the best application experience to the users of endpoints 502, it is also entirely possible that another SP 506 is able to offer better application experience to those users.

Service Provider Selection for Application-Driven Routing

The techniques introduced herein allow for the selection of the optimal service provider to convey traffic between a particular location and an SaaS application. In some aspects, the techniques herein a.) examine the historical data of service provider connectivity across multiple customers, b.) map the service provider connectivity to various SaaS applications performances, c.) learn the application being used by a given customers and relative experiences, and d.) dynamically switches to the best service provider available on edge routers for enhancing experience for various applications. If enterprise users are experiencing unsatisfactory application experience, and the edge routers do not have connectivity to better service providers, then the system may rank and recommend alternate service providers that can be used at a given location, based on the set of applications being used by the enterprise.

Illustratively, the techniques described herein may be performed by hardware, software, and/or firmware, such as in accordance with service provider selection process 248, which may include computer executable instructions executed by the processor 220 (or independent processor of interfaces 210) to perform functions relating to the techniques described herein (e.g., in conjunction with routing process 244).

Specifically, according to various embodiments, a device receives application experience metrics for a software-as-a-service application. The device generates, based is on the application experience metrics, a predictive model that predicts application experience scores for a plurality of network service providers that provide connectivity to the software-as-a-service application. The device selects a particular network service provider for use by a location, based on an application experience score predicted by the predictive model. The device sends an indication of the particular network service provider to the location.

Operationally, as noted, a common deployment model consists in connecting each edge router to multiple service providers (SPs), as described previously with respect to FIG. 5. Under this type of configuration (SaaS) applications can be reached over any of the SPs. The techniques herein allow for application traffic to be dynamically rerouted via the best SP, so as to maximize the application experience of its users. Even in cases when none of the SPs provide good application experience, the techniques herein can still be used to recommend the best SP for a particular location.

Figure 6:
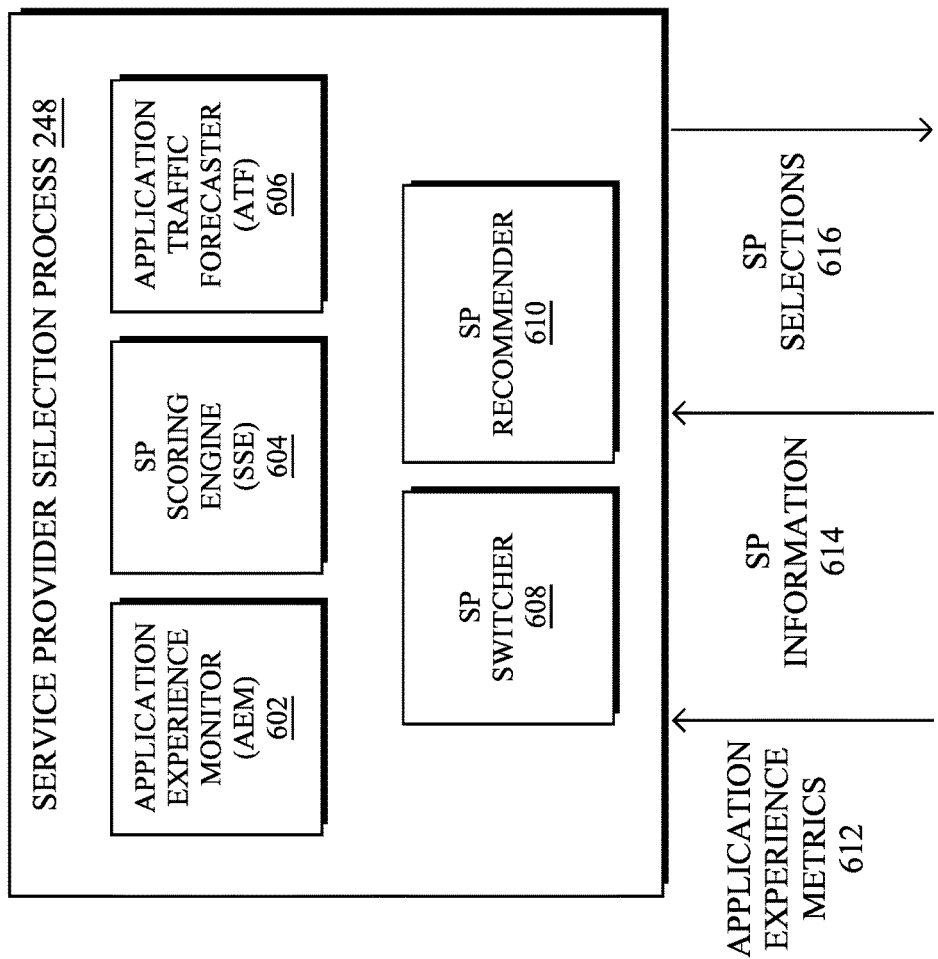
FIG. 6 illustrates an example architecture for selecting a service provider.

FIG. 6 illustrates an example architecture for selecting a service provider, according to various embodiments. At the core of architecture 600 is service provider selection process 248, which may be executed by a supervisory device of a network or another device in communication therewith. For instance, service provider selection process 248 may be executed by an SDN controller (e.g., SDN controller 408 in FIGS. 4A-4B), a particular networking device in the network (e.g., a router, etc.), an endpoint (e.g., a client endpoint 502 or a server of an SaaS application 508), or another device in communication therewith. In other cases, service provider selection process 248 may be executed in whole, or in part, by a networking device in the network, such as a border router, etc.

As shown, service provider selection process 248 may include any or all of the following components: an application experience monitor (AEM) 602, an SP scoring engine (SSE) 604, an application traffic forecaster (ATF) 606, an SP switcher 608, and/or an SP recommender 610. As would be appreciated, the functionalities of these is components may be combined or omitted, as desired. In addition, these components may be implemented on a singular device or in a distributed manner, in which case the combination of executing devices can be viewed as their own singular device for purposes of executing service provider selection process 248.

In various embodiments, application experience monitor (AEM) 602 is responsible for collecting application experience metrics 612 regarding an SaaS application. For instance, service provider selection process 248 may leverage an application experience ingestion application programming interface (API) with the SaaS application provider. In turn, the SaaS provider may publish data about the application experience to service provider selection process 248 periodically (e.g., once every ten minutes), on demand, or at any other time. In other cases, service provider selection process 248 may first request application experience metrics 612 from the SaaS application. In other cases, application experience metrics 612 may be published to a message broker to which service provider selection process 248 is subscribed.

A sample set of application experience metrics 612 is as follows:
Application Name
Session ID
Endpoint ID: Server Name
Data center ID: data center to which the server belongs
Time Period
Application Experience (e.g., a score from 1-100, discrete categories such as {good, bad, no-opinion}, etc.)

In other words, the application experience metrics may be user-specified during or after their use of the SaaS application. For instance, a web conferencing application may ask the attendees of a virtual meeting to rate their experience on a scale from 1-5, 1-10, 1-100, etc., on conclusion of the meeting. The polling of the users may be performed directly within the application or, alternatively, by an external mechanism, such as an agent executing on the client endpoint, webpage forms, email voting, or the like.

According to various embodiments, AEM 602 may also receive SP information 614 associated with the various application experience metrics 612. In general, SP information 614 may indicate which SP was used to provide connectivity between an endpoint and the SaaS application for which application experience metrics 612 were collected. For instance, consider the case in which a user rated their experience with the SaaS application at time T. SP information 614 may indicate that a particular SP was used to provide the connectivity to the application at time T, thereby allowing AEM 602 to make an association between this rating and the SP that was used.

In some instances, SP information 614 may also include network performance metrics for the various SPs. For instance, such network performance metrics may include any or all of the following:
Loss
Latency
Jitter
Bitrate In some embodiments, application experience metrics 612 and/or SP information 614 may further be identified by NEM 602 as being associated with a particular geographic region. For instance, application experience metrics 612 and SP information 614 may be divided based on their source cities/metropolitan areas, states, countries, etc. Indeed, the performance of connectivity of an SP to an SaaS application can vary greatly between different geographic areas. Such a capability is critical because it is fairly common for an enterprise to gradually deploy new SaaS applications, new services, etc. Accordingly, AEM 602 may keep monitoring the top n-number of SaaS application and alert the user when a new application in the top-N is being used and should benefit from the optimizations afforded by service provider selection process 248. For example, if Office 365 is being deployed to enterprise locations in Asia, AEM 602 may detect an increase of the use of this SaaS application and may ask a network administrator or policy engine whether to optimize the SP selection.

In various embodiments, service provider selection process 248 may also include SP scoring engine (SSE) 604, which is responsible for ranking the SPs for each application. This component will utilize the data measured by AEM 602, and then estimate and/or predict the SP performance for a given application. More specifically, SSE 604 may use application experience metrics 612 and SP information 614 as training data to generate a predictive model that predicts application experience scores for pairs of SPs and applications, <$SP_i$, $App_A$>. For instance, the prediction model may take the form of a machine learning-based model, statistical model, or other predictive model. In some instances, the predictions may also be tied to a geographic area, such as on a per-city basis.

Figure 7:
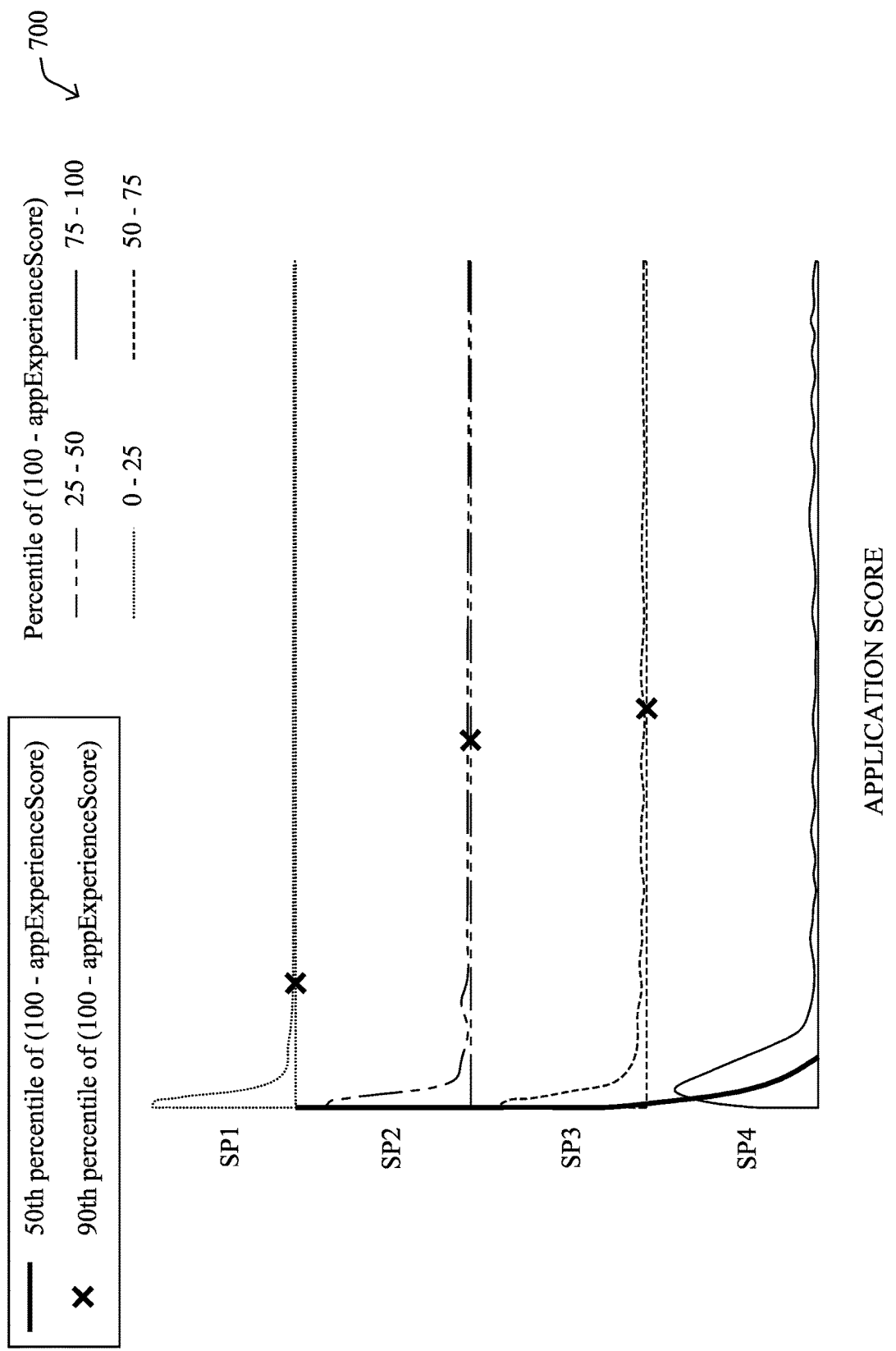
FIG. 7 illustrates an example plot of application experience scores for different service providers.

As would be appreciated, the variation of application experience scores may vary considerably between service providers in a particular area. For instance, FIG. 7 illustrates an example plot 700 of application experience scores for different service providers. More specifically, plot 700 illustrates the distributions of (100–appExperienceScore) four different service providers, SP1-SP4, that provide connectivity to a particular SaaS application. As can be seen, certain SPs offer much better application experience than others, with smaller values of (100–appExperienceScore) being considered 'better.' Testing has shown that application experience can vary considerably among SPs, even when those SPs are all within the same city. Thus, selecting the optimal SP is crucial to ensuring satisfactory application experience for users.

Referring again to FIG. 6, SSE 604 may base its application experience scores on a representative statistic. (e.g., mean, median, $90^{th}$ percentile) for a given period of time. In another embodiment, SSE 604 may compare a pair of SPs, to see which has a better distribution of application experience scores. For example, a one-sided two sample hypothesis test can be run to ascertain if the application experience score observed on SP1 is significantly greater than those observed over SP2. Tests such as Anderson Darling, and Mann Whitney U statistic can be used for such purposes. Then, SSE 603 may rank all the SPs and ordered based on pair-wise superiority of one SP over another. In yet other embodiments, time-based variation of application experience can be forecasted. For instance, SSE 604 may monitor a historical time-series of application experience scores for a given <$SP_i$, $App_A$> combination, and forecast the application experience score for a future time t. This can be done, for instance, using a forecasting approach such as an autoregressive integrated moving average (ARIMA), Holt-Winters, DeepAR, recursive neural network, or the like. This prediction of application experience scores across multiple SPs for a given $App_A$ and time t can serve as a strategy to then rank SPs for a particular location.

In some embodiments, SSE 604 may re-compute application experience scores on a periodic basis or on demand. Indeed, per-SP application experience is likely to evolve with new peering agreements in the Internet (for good or bad), but also the deployment of new workload by the SaaS provider. 1n one embodiment, SSE 604 may recompute the scores on a regular basis and then updated. In another embodiment, SSE 604 may detect a significant change in the distribution of application experience metrics 612, to trigger recomputation of the scores. In yet another embodiment, route changes, such as those signaled via the Border Gateway Protocol (BGP), revealing new peering leading to substantial AP-Path change, to trigger updated scoring.

In various embodiments, service provider selection process 248 may optionally also include application traffic forecaster (ATF) 606, which is responsible for forecasting the application traffic for one or more applications for a given time. This forecasting can be used to switch to a better SP, only when ATF 606 predicts that there will be application traffic for that application. Various mechanisms can be used to identify the application traffic passing through an edge router, such as Deep Packet Inspection (DPI), Network-Based Application Recognition (NBAR) from Cisco Systems, Inc., or the like. Based on this, ATF 606 may construct a timeseries of application sessions or traffic which passes through a given edge router. In turn, ATF 606 may use a forecasting model (e.g., an ARIMA model, a recurrent neural network, Facebook Prophet, etc.), to predict the application traffic for that router.

Another potential component of service provider selection process 248 is SP switcher 608, which is responsible for switching the traffic for application $App_A$ to an optimal SP. In one embodiment, SP switcher 608 may assess all of the available edge routers for a location and their available interfaces. For instance, consider an edge router $ER_x$ that has a interfaces connecting to n SPs {$SP_1, \ldots, SP_n$}. In such a case, SP switcher 608 may query SSE 604, to check which of the SPs provide best experience. In turn, SP switcher 608 may program that router to switch the application traffic over the best SP for a given application from a given city or other geographic area. To this end, SP switcher 608 may send an indication 616 of the selected SP to the edge router, a user interface operated by a network administrator, other controller for the edge router, or the like. Note that this swapping of SPs is quite different than what is done today, which typically relies on the results of probing the various available paths, to make these decisions.

In another embodiment, SP Switcher 608 may also take as input the predicted traffic loads from ATF 606. This provides the expected number of application sessions in the next time-period. Based on this, SP Switcher 608 may choose to activate the best SP for each application. In addition, SP switcher 608 may periodically change the SP over time for a given SaaS application, such as when ATF 606 produces new forecasts for the next time period.

A further component of service provider selection process 248 may be SP recommender 610, which is responsible for recommending the best SP for a given application and edge router/location, when that edge router does not currently share an interface with that SP. Indeed, it may be the case that the enterprise network is not currently using the 'best' SP for a given application that is available in that area. To do so, SP recommender 610 may first examine the outputs of SP switcher 608. If none of the SPs available at the site provide acceptable application experience, then SP recommender 610 may provide an indication 616 of the optimal SP for review by a network administrator, based on the assessment by SSE 604 of SPs in that geographic area. Here, the notion of acceptable application experience can either be specified by an expert or SP recommender 610 may learn these levels across multiple SPs over a particular geographic area. For example, a good application experience can be thought of as the median application experience score across all SPs in a given city. In some instances, SP recommender 610 may also estimate the number of sessions that, would have a better application experience, should a location be switched over to connecting to the application using a different SP. This will allow the network administrator to make a judicious choice as to whether to contract with a new SP.

In another embodiment, SP recommender 610 will consider all the applications that are currently going over a suboptimal SPs, and then collectively score each other available SP in the city based on application experiences of all applications. Several techniques can be considered when constructing such a combined score for an SP, A simple weighted approach can be employed by SP recommender 610 whereby each SP is scored by the number of sessions for each application that would have had an estimated experience score, if routed via an alternative SP. For example, if an alternative $SP_x$ is employed, then i sessions of $App_A$ and j sessions of $App_B$ can be saved. However, it may harm k sessions of $App_C$ since $SP_x$ was estimated not to have a better experience. In such a case, the score for $SP_x$ can be constructed as (i+j−k) for all applications.

Other constrained techniques can also be employed by SP recommender 610. For example, an optimization problem can be formed to select the best SP which maximizes the overall number of sessions with good experience, with the constraint that it does not reduce the experience of any application by more than 10%. In another embodiment, the SP recommender 610 may periodically provide a report of which other SPs are better than the current SPs for a given edge router or site, even if the current SPs have good performance.

Figure 8:
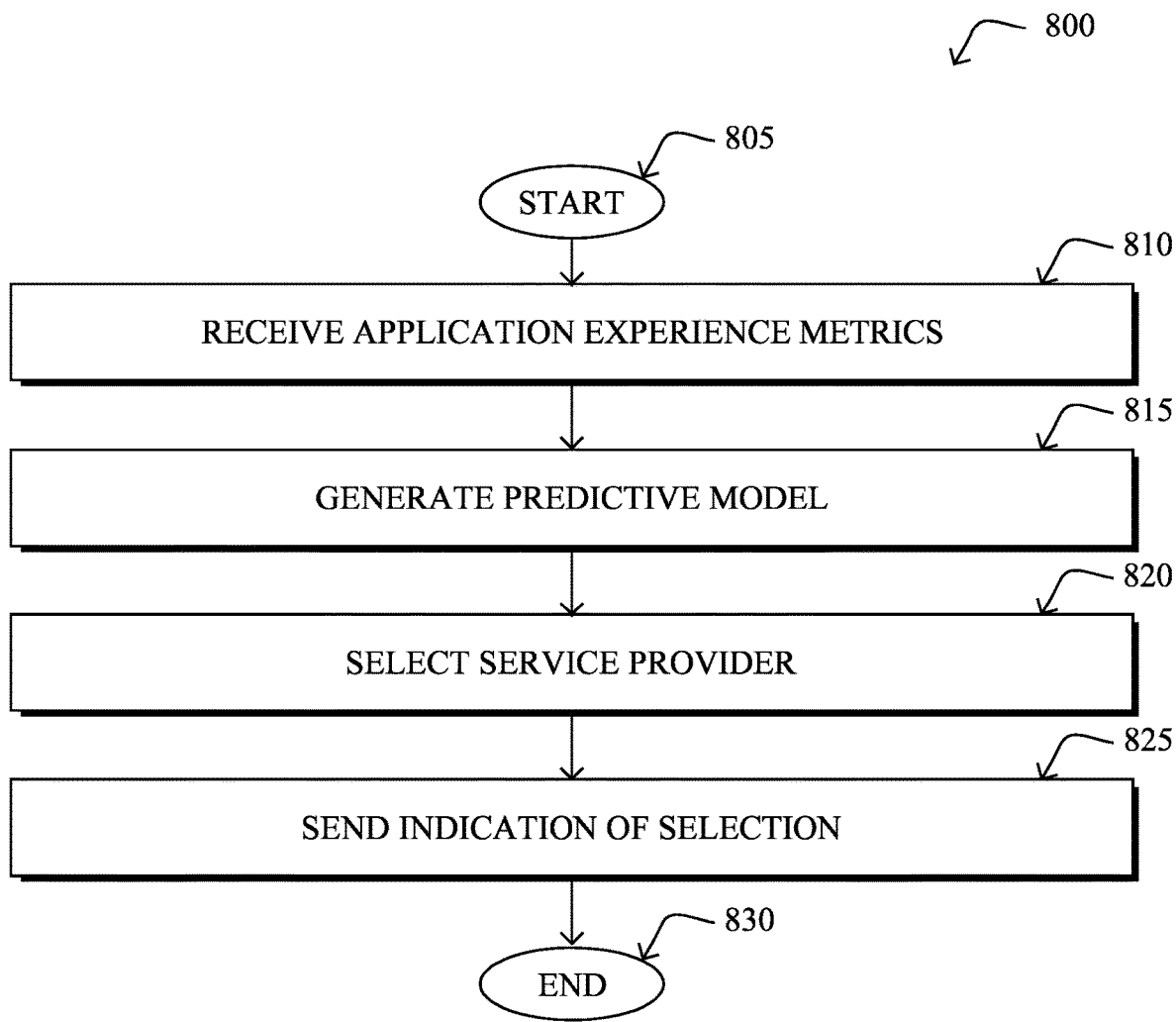
FIG. 8 illustrates an example simplified procedure for selecting a service provider to provide connectivity between a location and a particular SaaS application.

FIG. 8 illustrates an example simplified procedure for selecting a service provider to provide connectivity between a location and a particular SaaS application, in accordance with one or more embodiments described herein. For example, a non-generic, specifically configured device (e.g., device 200), such as a networking device (e.g., a router, an SDN controller for an SD-WAN, an SaaS endpoint, an SaaS application client, etc.), or a device in communication therewith, may perform procedure 800 by executing stored instructions (e.g., service provider selection process 248). The procedure 800 may start at step 805, and continues to step 810, where, as described in greater detail above, the device may receive application experience metrics for a software-as-a-service application. For instance, users of the application may specify their application experiences (e.g., a rating of their happiness or displeasure with the performance of the application, etc.) either directly within the application or through another external feedback mechanism. In various embodiments, the device may receive the application experience metrics from a message broker, via an API for the application, or through other means.

At step 815, as detailed above, the device may generate, based on the application experience metrics, a predictive model that predicts application scores for a plurality of network service providers that provide connectivity to the SaaS application. For instance, the application experience metrics may be associated with the network service providers that provided connectivity to the application from which the application experience metrics stemmed. Using such information, the device may generate a machine learning-based model or other predictive model, to predict application experience scores, such as for a particular location using a particular network service provider to access the SaaS application. In some embodiments, the predictive model may also take into account the geographic area that includes the location. For instance, the model may differentiate between different geographic areas (e.g., metropolitan areas, states, countries, etc.), when predicting an application experience scores for the same service provider. In further embodiments, the model may also take into account the volume of traffic expected to be conveyed between the location and the application.

At step 820, the device may select a particular network service provider for use by a location, based on an application experience score predicted by the predictive model, as described in greater detail above. For instance, the device may select the service provider is that has the best predicted application experience score for the location. In some embodiments, the selection may also be time-based, thereby allowing the system to dynamically select the best network service provider for the location at any given time.

At step 825, as detailed above, the device may send an indication of the particular network service provider to the location. In some embodiments, the device may send the indication for presentation to a user, such as a network administrator. In further embodiments, the device may send the indication to an edge router at the location. In turn, this may cause the edge router to switch to using the particular network service provider to access the application, instead of a different network service provider. In yet another embodiment, the device may also predict an amount of traffic between the location and the application and the edge router may switch between service providers based in part on the predicted amount of traffic. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, are able to identify the service provider that is expected to give the best application experience to users at a location for a particular SaaS application. In some aspects, the selection of service provider can be dynamic, thereby allowing the location to switch between service providers at different times or under different conditions, such as traffic loads.

While there have been shown and described illustrative embodiments that provide for selecting the optimal service provider to provide connectivity to a SaaS application, it is to be understood that various other adaptations and modifications may be made within the spirit and scope of the embodiments herein. For example, while certain embodiments are described herein with respect to using certain models for purposes of predicting application experience scores, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   receiving, at a device, application experience metrics for a software-as-a-service application;
   generating, by the device and based on the application experience metrics, a predictive model that predicts application experience scores for a plurality of network service providers that provide connectivity to the software-as-a-service application;
   selecting, by the device, a particular network service provider for use by a location, based on an application experience score predicted by the predictive model, wherein the predictive model predicts the application experience score for a future time based on a particular geographic area that includes the location and a volume of traffic expected to be conveyed at the future time between the location and the software-as-a-service application; and sending, by the device, an indication of the particular network service provider to the location, wherein the indication of the particular network service provider causes an edge router located at the location to switch to using the particular network service provider instead of a different network service provider.

2. The method as in claim 1, wherein the device receives the application experience metrics via an application programming interface.

3. The method as in claim 1, wherein sending the indication of the particular network service provider to the location comprises:

sending the indication to an edge router located at the location.

4. The method as in claim 1, further comprising:

predicting, by the device, an amount of traffic between the location and the software-as-a-service application, wherein the edge router switches to using the particular network service provider instead of the different network service provider based in part on the predicted amount of traffic.

5. The method as in claim 1, wherein the device sends the indication of the particular network service provider to the location for presentation to a user.

6. The method as in claim 1, wherein the application experience metrics are specified by users of the software-as-a-service application.

7. The method as in claim 1, wherein the predictive model is a machine learning-based model.

8. The method as in claim 1, wherein the device is a controller for a software-defined wide area network (SD-WAN).

9. An apparatus, comprising:

one or more network interfaces;

a processor coupled to the one or more network interfaces and configured to execute one or more processes; and a memory configured to store a process that is executable by the processor, the process when executed configured to:

receive application experience metrics for a software-as-a-service application;

generate, based on the application experience metrics, a predictive model that predicts application experience scores for a plurality of network service providers that provide connectivity to the software-as-a-service application;

select a particular network service provider for use by a location, based on an application experience score predicted by the predictive model, wherein the predictive model predicts the application experience score for a future time based on a particular geographic area that includes the location and a volume of traffic expected to be conveyed at the future time between the location and the software-as-a-service application; and send an indication of the particular network service provider to the location, wherein the indication of the particular network service provider causes an edge router located at the location to switch to using the particular network service provider instead of a different network service provider.

10. The apparatus as in claim 9, wherein the apparatus receives the application experience metrics via an application programming interface.

11. The apparatus as in claim 9, wherein the apparatus sends the indication of the particular network service provider to the location by:

sending the indication to an edge router located at the location.

12. The apparatus as in claim 9, wherein the process when executed is further configured to:

predict amount of traffic between the location and the software-as-a-service application, wherein the edge router switches to using the particular network service provider instead of the different network service provider based in part on the predicted amount of traffic.

13. The apparatus as in claim 9, wherein the apparatus sends the indication of the particular network service provider to the location for presentation to a user.

14. The apparatus as in claim 9, wherein the application experience metrics are specified by users of the software-as-a-service application.

15. The apparatus as in claim 9, wherein the apparatus is a controller for a software-defined wide area network (SD-WAN).

16. A tangible, non-transitory, computer-readable medium storing program instructions that cause a device to execute a process comprising:

receiving, at a device, application experience metrics for a software-as-a-service application;

generating, by the device and based on the application experience metrics, a predictive model that predicts application experience scores for a plurality of network service providers that provide connectivity to the software-as-a-service application;

selecting, by the device, a particular network service provider for use by a location, based on an application experience score predicted by the predictive model, wherein the predictive model predicts the application experience score for a future time based on a particular geographic area that includes the location and a volume of traffic expected to be conveyed at the future time between the location and the software-as-a-service application; and sending, by the device, an indication of the particular network service provider to the location, wherein the indication of the particular network service provider causes an edge router located at the location to switch to using the particular network service provider instead of a different network service provider.

* * * * *

UNITED STATES PATENT AND TRADEMARK OFFICE
CERTIFICATE OF CORRECTION

PATENT NO. : 11,496,556 B1
APPLICATION NO. : 17/240292
DATED : November 8, 2022
INVENTOR(S) : Vinay Kumar Kolar et al.

Page 1 of 2

It is certified that error appears in the above-identified patent and that said Letters Patent is hereby corrected as shown below:

In the Specification

Column 10, Line 26, should read:
as $E_{11}$-$E_{1n}$ shown, and an edge router 110c. In turn, edge Column 11, Line 8, should read:
service application. The device generates, based on the Column 11, Line 46, should read:
appreciated, the functionalities of these components may Column 12, Line 41, should read:
AEM 602 as being associated with a particular geographic Column 13, Line 21, should read:
cation experience scores on a representative statistic (e.g., Column 13, Line 48, should read:
provide. In one embodiment, SSE 604 may recompute the Column 14, Line 11, should read:
n interfaces connecting to n SPs (SP$_1$, ..., SP$_n$}. In such a Column 14, Line 50, should read:
estimate the number of sessions that would have a better Column 14, Line 60, should read:
constructing such a combined score for an SP. A simple Signed and Sealed this
Second Day of January, 2024

Katherine Kelly Vidal
*Director of the United States Patent and Trademark Office*

Column 15, Line 59, should read:
may select the service provider that has the best predicted